United States Patent
Yoon et al.

(10) Patent No.: US 8,663,591 B2
(45) Date of Patent: Mar. 4, 2014

(54) METHOD OF PREPARING GRAPHENE SHELL AND GRAPHENE SHELL PREPARED USING THE METHOD

(75) Inventors: Seon-mi Yoon, Yongin-si (KR); Jae-young Choi, Yongin-si (KR); Hyeon-Jin Shin, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1072 days.

(21) Appl. No.: 12/131,703

(22) Filed: Jun. 2, 2008

(65) Prior Publication Data

US 2009/0155161 A1 Jun. 18, 2009

(30) Foreign Application Priority Data

Dec. 17, 2007 (KR) ........................ 10-2007-0132681

(51) Int. Cl.
| | | |
|---|---|---|
| *C01B 31/00* | (2006.01) | |
| *C01B 31/04* | (2006.01) | |
| *D01C 5/00* | (2006.01) | |
| *D01F 9/12* | (2006.01) | |
| *B05D 3/02* | (2006.01) | |

(52) U.S. Cl.
USPC .............. 423/445 R; 423/447.3; 423/447.4; 423/447.8; 423/448; 423/445 B; 427/372.2; 427/379

(58) Field of Classification Search
USPC ......... 423/445 R, 447.3, 447.4, 447.5, 447.8, 423/448, 445 B; 427/372.2, 379; 977/842, 977/843, 890, 891
See application file for complete search history.

(56) References Cited

U.S. PATENT DOCUMENTS

| | | | | |
|---|---|---|---|---|
| 7,074,380 | B2 * | 7/2006 | Iwaki et al. ................ | 423/447.3 |
| 7,270,795 | B2 * | 9/2007 | Kawakami et al. ........ | 423/447.1 |
| 7,329,398 | B2 * | 2/2008 | Kim .......................... | 423/447.3 |
| 2002/0193040 | A1 * | 12/2002 | Zhou ............................. | 445/51 |
| 2008/0159938 | A1 * | 7/2008 | Mauthner et al. ............ | 423/246 |

FOREIGN PATENT DOCUMENTS

| | | |
|---|---|---|
| JP | 2006063449 A | 3/2006 |
| JP | 2006089370 A | 4/2006 |
| JP | 2006273707 A | 10/2006 |
| WO | 2007044614 A2 | 4/2007 |

OTHER PUBLICATIONS

Choi et al., "Formation of Shell-Shaped Carbon Nanoparticles Above a Critical Laser Power in Irradiated Acetylene," 2004, Adv. Mater., 16, No. 19, pp. 1721-1725.*
Altman et al., "Analysis of the mechanism of the critical transition in irradiated acetylene that leads to generation of shell-shaped carbon nanoparticles," 2005, Carbon, 43, pp. 2693-2700.*

(Continued)

*Primary Examiner* — Bijay Saha
(74) *Attorney, Agent, or Firm* — Cantor Colburn LLP

(57) ABSTRACT

Provided are a method of preparing a graphene shell and a graphene shell prepared using the method. A first heat treatment is performed on a mixture of an organic solvent and a graphitization catalyst so as to carburize the graphitization catalyst with carbon decomposed from the organic solvent. The graphitization catalyst is in the form of particles. A second heat treatment process is performed on the carburized graphitization catalyst in an inert or reductive gas atmosphere to thereby form graphene shells on surfaces of the carburized graphitization catalyst.

30 Claims, 9 Drawing Sheets

(56) References Cited

OTHER PUBLICATIONS

Yoon et al., "Graphitized Pitch-Based Carbons with Ordered Nanopores Synthesized by Using Colloidal Crystals as Templates," 2005, J. Am. Chem. Soc., 127, pp. 4188-4189.*
Nature, vol. 418, pp. 964-967, Aug. 29, 2002.
Japanese Office Action with English Translation for Application No. 2008-318431 dated Jul. 23, 2013.
Korean Office Action with English Translation for Application No. 10-2007-0132681 dated Aug. 29, 2013.
Yoon, et al., Graphitized Pitch-Based Carbons with Ordered Nanopores Synthesized by Using Colloidal Crystals as Templates, J. Am. Chem. Soc. vol. 127, No. 12, 2005, pp. 4188-4189.

* cited by examiner

METHOD OF PREPARING GRAPHENE SHELL AND GRAPHENE SHELL PREPARED USING THE METHOD

This application claims priority to Korean Patent Application No. 10-2007-0132681, filed on Dec. 17, 2007, in the Korean Intellectual Property Office, and all the benefits accruing therefrom under 35 U.S.C. §119, the contents of which is incorporated herein in its entirety by reference.

BACKGROUND OF THE INVENTION

This disclosure relates to a method of preparing a graphene shell and a graphene shell obtained using the method.

Generally, graphite exists in the form of stacked two-dimensional graphene sheets each made of hexagonally connected carbon atoms. Recent research has found that one or more graphene sheets ripped from graphite have very useful characteristics different from existing materials.

One of the recently discovered characteristics of the graphene sheets is very attractive in that electrons move in the graphene sheets as if they have no mass. This means that the electrons can move at the speed of light in a vacuum. Furthermore, the graphene sheets have an unusual electron-hole characteristic, that is, a half-integer quantum hall effect.

Currently known electron mobilities of graphene sheets range from about 20,000 $cm^2/Vs$ to 50,000 $cm^2/Vs$. Carbon nanotubes are expensive due to poor purification yields even though they are synthesized using inexpensive materials. Thus, carbon nanotubes are not cost-competitive as compared with inexpensive graphite sheets. Single wall carbon nanotubes have metal characteristics or semiconductor characteristics depending on their chirality and diameter. In addition, although single wall carbon nanotubes have semiconductor characteristics, they have different energy band gaps. Therefore, for example, when only metallic single wall carbon nanotubes or only semiconductor single wall nanotubes are necessary, the metallic single wall carbon nanotubes or semiconductor single wall nanotubes should be separated from given single wall nanotubes. However, in practical terms, it is very difficult to separate single wall carbon nanotubes according to their characteristics.

However, the electrical characteristics of graphene sheets vary depending on the crystalline direction of a given thickness of graphene sheets, and thus can be controlled. Desired devices can be easily manufactured using the graphene sheets. These characteristics of the graphene sheets may be very useful for carbon-based electrical devices or carbon-based electromagnetic devices.

However, it is difficult to devise a cost effective and highly reproductive method of fabricating graphene sheets into three-dimensional structures. Currently known methods thereof include a micromechanical method and a SiC crystal thermal decomposition method.

In the micromechanical method, a sheet of tape such Scotch tape is attached to graphite, and then the tape is stripped off to obtain graphene sheets adhered to the tape. However, in this case, the number of graphene sheets is not predictable, and the shapes of the obtained graphene sheets are irregular like torn papers.

In the SiC crystal thermal decomposition method, a SiC single crystal is heated to disintegrate SiC of a surface layer, and thus removing Si. The remaining carbon (C) forms a graphene sheet. However, the SiC crystal thermal decomposition method is disadvantageous in that the SiC single crystal is very expensive, and it is difficult to fabricate a large graphene sheet. Furthermore, it is difficult to control the crystalline characteristics and three-dimensional shape of the graphene sheet.

Therefore, there is a need for a method of fabricating graphene sheets having good crystalline characteristics and a three-dimensional structure.

SUMMARY OF THE INVENTION

The present invention provides a method of preparing a graphene shell.

The present invention also provides a graphene shell prepared using the method.

Disclosed is a method of preparing a graphene shell, the method including: performing a first heat treatment on a mixture of an organic solvent and a graphitization catalyst having three-dimensional particles so as to carburize the graphitization catalyst with carbon decomposed from the organic solvent; and forming graphene shells on surfaces of the carburized graphitization catalyst by performing a second heat treatment process on the carburized graphitization catalyst in an inert or reductive gas atmosphere.

The organic solvent may include an alcohol based organic solvent, an ether based organic solvent, a ketone based organic solvent, an ester based organic solvent, or an acid based organic solvent.

The organic solvent may include at least one organic solvent selected from the group consisting of monohydric alcohols and polyhydric alcohols.

The organic solvent may include at least one material selected from the group consisting of water and bases.

The graphitization catalyst may be formed from a catalyst precursor in the organic solvent before or simultaneously with the carburization of the graphitization catalyst.

The catalyst precursor may be a metal salt of the graphitization catalyst.

The three-dimensional particles of the graphitization catalyst may have a spherical shape, a cylindrical shape, or a polyhedral shape.

The graphitization catalyst may include at least one material selected from the group consisting of Ni, Co, Fe, Pt, Au, Al, Cr, Cu, Mg, Mn, Mo, Rh, Si, Ta, Ti, W, U, V, and Zr.

The first heat treatment process may be performed in a temperature range of about 100° C. to about 400° C.

The second heat treatment process may be performed in a temperature range of about 400° C. to about 1000° C. for about several seconds to about 10 hours.

The method may further include performing an acid treatment process to remove the graphitization catalyst from the graphene shells for separating the graphene shells after the forming of the graphene shells.

The method may further include performing a third heat treatment process on the graphene shells after the performing of the acid treatment process.

The third heat treatment process may be performed at a temperature range of about 1000° C. to about 3000° C. for about several seconds to about 10 hours.

The graphene shells may have a variable thickness by adjusting a rate and time of the carburizing of the graphitization catalyst or times of the first and second heat treatment processes.

The graphene shells may have a shape determined by a shape of the three-dimensional particles of the graphitization catalyst.

Further disclosed is a graphene shell obtained using the method.

BRIEF DESCRIPTION OF THE DRAWINGS

The above and other features and advantages of the disclosed embodiments will become more apparent by describing in detail exemplary embodiments thereof with reference to the accompanying drawings, in which.

DETAILED DESCRIPTION OF EXEMPLARY EMBODIMENTS

Figure 1:
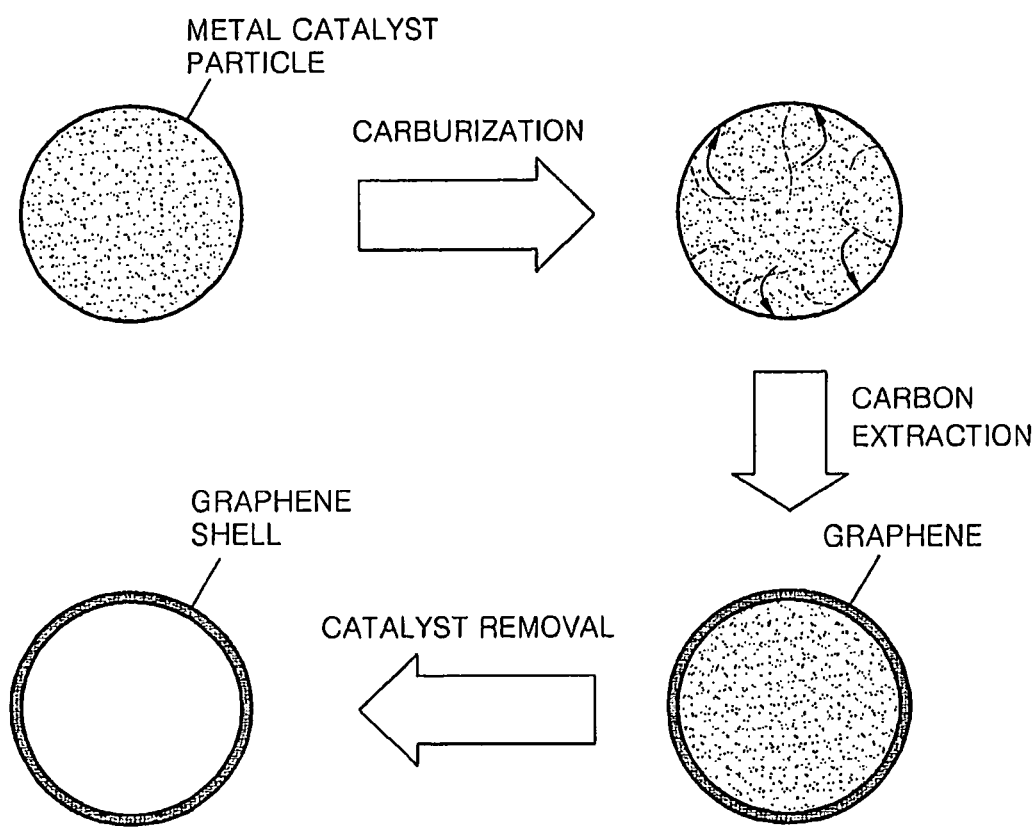
FIG. 1 is a schematic view illustrating a method of preparing a graphene shell.

Disclosed embodiments will now be described more fully with reference to the accompanying drawings, in which exemplary embodiments are shown.

It will be understood that when an element is referred to as being "on" another element, it can be directly on the other element or intervening elements may be present therebetween. In contrast, when an element is referred to as being "disposed on" or "formed on" another element, the elements are understood to be in at least partial contact with each other, unless otherwise specified.

The terminology used herein is for the purpose of describing particular embodiments only and is not intended to be limiting of the invention. As used herein, the singular forms "a", "an" and "the" are intended to include the plural forms as well, unless the context clearly indicates otherwise. The use of the terms "first", "second", and the like do not imply any particular order but are included to identify individual elements. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements and the thicknesses of layer and regions are exaggerated for clarity.

According to an exemplary embodiment, a method of preparing a graphene shell is provided. The graphene shell can be used in various fields. The graphene shell has good crystalline characteristics. The shape and the thickness of the graphene shell can be easily controlled.

The term "graphene" is used herein to denote polycyclic aromatic molecules each having a plurality of covalently connected carbon atoms. 6-membered rings of covalently connected carbon atoms can be arranged in the graphene, and 5-membered and/or 7-membered rings of covalently connected carbon atoms can be further arranged in the graphene. Therefore, the graphene can be seen as a single layer of covalently bonded carbon atoms (Generally, $sp^2$ bonds). The graphene can have various shapes including three-dimensional shapes such as a spherical shape, a cylindrical shape, and a polyhedral shape. A graphene having such three-dimensional shapes may be referred to as a graphene shell. The polyhedral shape includes a tetrahedral shape and a hexahedral shape. The hexahedral shape includes a hexahedral shape having a small thickness as compared with its length and width. That is, the hexahedral shape includes a plate shape having a small thickness as compared with its area. However, the hexahedral shape may not include a spherical shape and a cylindrical shape.

The shape of the graphene shell can be determined by the positions and concentrations of 5-membered and/or 7-membered rings included in the graphene shell. The graphene shell may have a hollow shape. Since the graphene shell can have structural defects due to, for example, cracks formed during a catalyst removing process performed after a shaping process, the shape of the graphene shell may not correspond exactly to a spherical shape, a cylindrical shape, or a polyhedral shape. In addition, the graphene shell includes a graphene sheet that can be obtained using an acid treatment process.

As explained above, the graphene shell can be formed of a single layer of graphene. Alternatively, the graphene shell can be formed of a plurality of stacked graphene layers. The graphene shell can have a maximal thickness of about 100 nm. Generally, a lateral distal end of the graphene shell is saturated with hydrogen atoms.

FIG. 1 is a schematic view illustrating a method of preparing a graphene shell, according to an exemplary embodiment. Referring to FIG. 1, three-dimensional graphitization catalyst is mixed with an organic solvent, and the mixture is treated through a first heat treatment process to carburize the graphitization catalyst with carbon decomposed from the organic solvent. Then, the carburized graphitization catalyst is separated from the mixture and is treated through a second heat treatment process in an inert or reductive gas atmosphere to form a graphene shell on the graphitization catalyst by drawing out the carbon from the graphitization catalyst. If necessary, the graphitization catalyst can be removed using an acid to separate the graphene shell and form a stand-alone graphene shell.

In the preparation of the graphene shell, the graphitization catalyst facilitates bonding of carbon components decomposed from the organic solvent. For example, a graphitization catalyst for fabricating graphite, a graphitization catalyst for carbonation, or a graphitization catalyst for fabricating carbon nanotubes can be used as the graphitization catalyst for preparing the graphene shell. The graphitization catalyst can include at least one material selected from the group consisting of Ni, Co, Fe, Pt, Au, Al, Cr, Cu, Mg, Mn, Mo, Rh, Si, Ta, Ti, W, U, V, Zr, and alloys thereof. Instead of using such metals or their alloys as the graphitization catalyst, ion precursors thereof can be used as the graphitization catalyst. Further details thereon will be described hereinafter.

Figure 2:
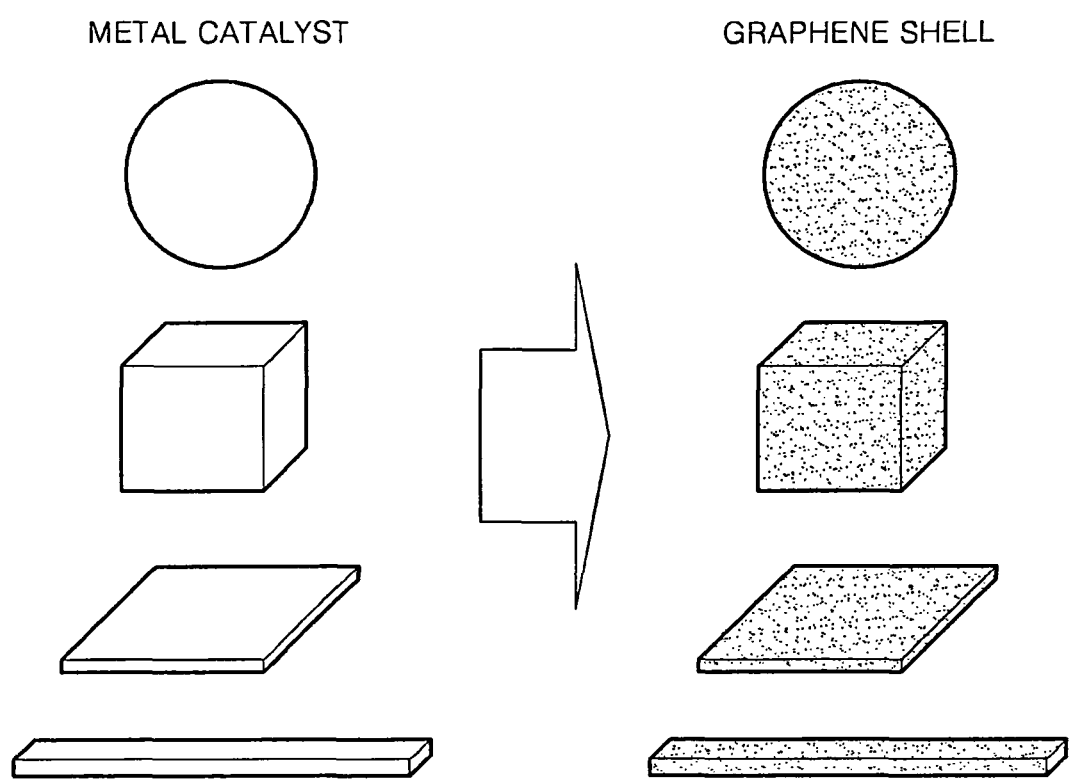
FIG. 2 is a schematic view illustrating three-dimensional shapes of graphene sheets prepared using three-dimensional catalyst metal particles.

Since the graphene shell is formed of a graphene layer deposited on the graphitization catalyst, the shape of the graphene shell is determined by the shape of the graphitization catalyst. Exemplary shapes of the graphene shell are shown in FIG. 2. FIG. 2 is a schematic view illustrating three-dimensional shapes of graphene sheets prepared using three-dimensional catalyst metal particles according to exemplary embodiments. For example, spherical graphene shells can be formed using a graphitization catalyst powder having spherical particles. Cylindrical graphene shells having both ends open can be formed using a graphitization catalyst powder having rod-shaped particles.

In the latter case, both ends of the rod-shaped particles of the graphitization catalyst powder are coated with an inactive material. If both ends of the rod-shaped particles of the graphitization catalyst powder are not coated with an inactive material, graphene shells having both ends closed may be formed. The cylindrical graphene shells may have a diameter of about 0.05 µm or greater. For example, the cylindrical graphene shells may have a diameter in the range of about 0.05 µm to about 100 µm.

As described above, the method of preparing the graphene shell may comprises (1) carburizing a graphitization catalyst with carbon decomposed from an organic solvent and (2) forming graphene on the surface of the carburized graphitization catalyst using the carbon.

(1) Carburization

The three-dimensional graphitization catalyst is treated in the organic solvent through a first heat treatment process. In the first heat treatment process, the graphitization catalyst facilitates decomposition of the organic solvent, and is carburized by carbon generated from the decomposition of the organic solvent.

The organic solvent can be any organic solvent that includes carbon as long as it can be thermally decomposed by the graphitization catalyst. For example, the organic solvent may be a polar or non-polar organic solvent having a boiling point of about 60° C. to about 400° C. In this regard, the organic solvent may be an alcohol based organic solvent, an ether based organic solvent, a ketone base organic solvent, an ester based organic solvent, an acid based organic solvent, or a mixture thereof. According to an exemplary embodiment, the alcohol based organic solvent or the ether based organic solvent can be used, considering adsorption to the graphitization catalyst, reactivity and reducibility. The alcohol based organic solvent can include one or more of monohydric alcohols and polyhydric alcohols. Examples of the monohydric alcohols include propanol, penaol, hexanol, heptanol, and octanol. Examples of the polyhydric alcohols include propylene glycol, diethylene glycol, dipropylene glycol, triethylene glycol, tripropylene glycol, octylene glycol, tetraethylene glycol, neopentyl glycol, 1,2-butanediol, 1,3-butanediol, 1,4-butanediol, 2,3-butanediol, dimethyl-2,2-butanediol-1,2, and dimethyl-2,2-butanediol-1,3. The monohydric and polyhydric alcohols can include ester groups as well as hydroxy group.

The organic solvent can be used alone, or a base can be added to the organic solvent. The base makes the carburization faster, and thus the graphene shells can be rapidly prepared. In addition, the base increases the viscosity of the organic solvent, and thus aggregation of particles can be controlled by adjusting the amount of the base. A base alone can be added to the organic solvent, or a base can be added to the organic solvent together with water. In the latter case, the base can be dissolved in the organic solvent more easily. The base can include at least one of an organic base and an inorganic base. Examples of the base include tetramethyl ammonium hydroxide (TMAH), sodium hydroxide, and potassium hydroxide. The amount of the base added to the organic solvent is not limited. According to an exemplary embodiment, the base can be added to the organic solvent in a concentration of about 0.01 M to about 5.0 M. If the concentration of the base is less than 0.01 M, carburization speed reduces, and it can become difficult to control aggregation of particles. On the other hand, if the concentration of the base is greater than 0.5 M, it may be difficult to separate particles from the organic solvent after reactions and wash the particles due to high viscosity.

Mechanism of thermal decomposition of an organic solvent by a graphitization catalyst has been disclosed in many articles such as Nature, vol 418, page 964, which is incorporated herein by reference. For example, when an organic solvent such as a polyhydric alcohol is thermally decomposed, substances such as alkane, $H_2$, $CO_2$, $H_2O$ are separated. Carbon components of the separated substances are absorbed into a catalyst.

The first heat treatment process for thermal decomposition and carburization can be performed while agitating the organic solvent and the graphitization catalyst to be sufficiently mixed with each other. The first heat treatment process can be performed at a temperature of about 100° C. to about 400° C. for about 10 minutes to about 24 hours. If the first heat treatment process is performed at a temperature lower than 100° C., the organic solvent can be insufficiently decomposed. On the other hand, if the first heat treatment process is performed at a temperature higher than 400° C., the particles can melt and agglomerate undesirably. If the first heat treatment process is performed for less than 10 minutes, the organic solvent can be insufficiently decomposed. On the other hand, if the first heat treatment process is performed for more than 24 hours, it is uneconomical.

Three-dimensional metal particles can be used as the graphitization catalyst. Alternatively, three-dimensional graphitization catalyst particles can be formed in the organic solvent by using a catalyst precursor such as a metal salt. That is, three-dimensional metal crystals can be formed as graphitization catalyst crystals by reducing the metal salt in the organic solvent before or at the beginning of the carburization process. When the graphitization catalyst crystals are formed at the beginning of the carburization process, the growth of the graphitization catalyst crystals can occur simultaneously with carburization, and thus carburization efficiency can be increased.

Examples of such catalyst precursors include acetates, nitrates, sulfates, and chloride hydroxides of metals that can be used as the graphitization catalyst.

When graphitization catalyst particles are formed in the organic solvent using such a catalyst precursor, a nucleating agent can be used to form the graphitization catalyst particles more finely and uniformly. Examples of the nucleating agent include $K_2PtCl_4$, $H_2PtCl_4$, $PdCl_2$, and $AgNO_3$. The amount of the nucleating agent added to the organic solvent can vary. For example, about $10^{-5}$ mol to about $2\times10^{-3}$ mol of the nucleating agent can be used per 1 mol of the catalyst precursor.

The carbon content in the graphitization catalyst particles can be adjusted by varying carburization conditions in order to obtain a desired graphene thickness. For example, an easily decomposable organic solvent can be used to obtain a large amount of carbon decomposed from the organic solvent. In this case, the graphitization catalyst particles can be carburized with a large amount of carbon. Furthermore, heat treatment temperature and time can be adjusted to carburize the graphitization catalyst particles with a desired amount of carbon. In this way, formation of graphene can be adjusted. That is, the thickness of a graphene layer forming a graphene shell can be easily controlled.

As explained above, three-dimensional particles of a carburized graphitization catalyst can be prepared through the carburization process. If necessary, the particles can be separated from the organic solvent, and then be washed and dried. Such separation, washing, and drying can be performed using well-known methods.

(2) Graphene Formation

The carburized graphitization catalyst particles having three-dimensional shapes is treated through a second heat treatment process in order to form graphene layers on the carburized graphitization catalyst particles by precipitating carbon out of the carburized graphitization catalyst particles.

The graphene formation process is performed through a simple heat treatment process. Carbon included in the carburized graphitization catalyst particles is drawn out of the carburized graphitization catalyst particles by heat, and the carbon forms the graphene layers on the surfaces of the carburized graphitization catalyst particles. In this way, graphene shells can be obtained.

The second heat treatment process may be performed in an inert or reductive atmosphere in order to prevent oxidation of carbon components.

The second heat treatment process can be performed at a temperature of about 400° C. to about 1000° C. If the second heat treatment process is performed at a temperature lower than about 400° C., sufficient graphitization may be not accomplished. On the other hand, if the second heat treatment process is performed at a temperature higher than 1000° C., the carburized graphitization catalyst particles (metal particles) can be fused and sintered. The second heat treatment process can be performed for about several seconds to about 10 hours. If the second heat treatment process is performed outside this time range, sufficient graphitization cannot be accomplished, or the process time may be unnecessarily long.

After the second heat treatment process, carbon components are covalently bonded into a hexagonal plate structure to form graphene shells on the graphitization catalyst particles. That is, the graphitization catalyst particles form cores, and the graphene shells are formed on the cores, thereby forming core-shell structures. If necessary, the cores can be removed using an acid. Then, only the graphene shells remain.

If the second heat treatment process is performed at a high temperature, the graphitization catalyst particles can be fused and sintered. In this case, the graphene shells may have non-uniform shapes. To solve this problem, the second heat treatment process can be performed in several steps. That is, after the second heat treatment process is performed at a temperature lower than about 1000° C., the graphitization catalyst particles can be removed using an acid. Then, a third heat treatment process can be performed on the graphene shells at a temperature of about 1000° C. to about 3000° C. for about several seconds to about 10 hours in order to strengthen the crystal structure of the graphene shells.

The graphene shell obtained through the carburization process and the graphene formation process can have a variable thickness. The thickness of the graphene shell can range from about 0.1 nm to about 100 nm. For example, the thickness of the graphene shell can be in the range of about 0.1 nm to about 20 nm. In some cases, the thickness of the graphene shell can be in the range of about 0.1 nm to about 10 nm. When the thickness of the graphene shell is about 0.1 nm, the graphene shell may be formed of a single layer. A thickness greater than 100 nm is outside the definition of graphene.

The first and second heat treatment processes can be performed using induction heating, thermal radiation, laser light, infrared light, microwaves, plasma, ultraviolet light, or a surface plasma furnace.

The graphene shells obtained in this way can be further processed in simple manner according to applications. The graphene shells can have various shapes such as a spherical shape, a polyhedral shape, or a cylindrical shape shown in FIG. 2. For example, in the case where the graphene shells have a spherical shape or polyhedral shape, the graphene shells can be used as a hydrogen receptor, a chemical carrier, or a micro reactor. In the case where the graphene shells have a cylindrical shape with both ends open, the graphene shells can be used as an optical fiber for transmitting optical signals or a conductor.

In general, hydrogen receptors are used to store hydrogen to conveniently and economically use the hydrogen as a clean fuel. In a conventional receptor, hydrogen is compressed to a pressure of about 100 atms or higher. In another conventional receptor, hydrogen is stored at a very low temperature lower than the boiling point of hydrogen. However, such hydrogen receptors are dangerous and uneconomical. In another conventional receptor, a special alloy is used to store hydrogen. However, when the alloy repeatedly stores and discharges hydrogen, the alloy can be deformed, and thus the hydrogen storage capacity of the alloy can decrease.

However, the graphene shells of the embodiments store hydrogen in a manner that hydrogen adsorbs to a solid substance. That is, the graphene shells can store hydrogen without causing any safety hazard or requiring any additional device. Since the graphene shells are uniform and have relatively large surface areas, a large amount of hydrogen can be stored. For example, the maximal capacity of the graphene shells of the embodiments can be 20% by weight of hydrogen based on the weight of graphene shells. Since the graphene shells have a dense structure, the graphene shells are not readily deformed even after hydrogen is stored and discharged many times.

In addition, when the graphene shells have a cylindrical shape with both ends open, the graphene shells can be effectively used as optical fibers. The graphene shells have advantages of glass-based optical fibers and plastic-based optical fibers. That is, since the graphene shells are flexible and have high electron mobility, the graphene shells have the advantages of glass-based optical fibers, such as a low transmission loss and high transmission rate. In addition, the graphene shells have the advantages of plastic based optical fibers, such as flexibility and easy handling.

The following examples are provided for illustrative purposes and are not intended to limit the scope of the claimed invention.

Example 1

After putting 30 g of nickel acetate and 500 ml of diethylene glycol in a reaction vessel, 89.7 ml of 25% TMAH aqueous solution and 0.0249 g of $K_2PtCl_4$ were added to the reaction vessel. Then the mixture was mechanically agitated at about 250 rpm at a temperature of about 230° C. or higher for about 4 hours using Despa in order to obtain a carburized nickel powder having a spherical shape. The powder was washed and separated by centrifugation. Then, the powder was dried in a vacuum oven at a temperature of about 50° C. overnight to obtain 7 g of a dried carburized nickel powder containing 6% by weight of carbon. Thereafter, the carburized nickel powder was heat treated at about 450° C. for about 1 hour in an argon gas atmosphere to form spherical graphene shells on the particle surfaces of the nickel powder.

Figure 3:
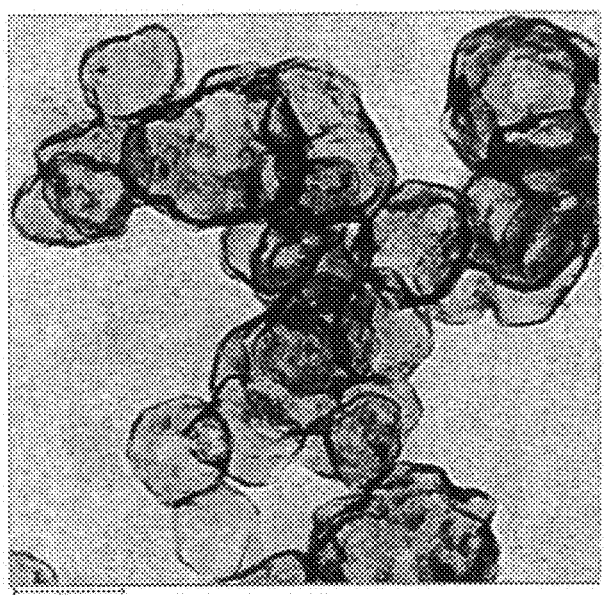
FIG. 3 is a transmission electron microscope (TEM) image of graphene shells of Example 1.

Next, the nickel powder formed with the graphene shells was washed using a hydrochloric acid solution to separate the graphene shells by removing the particles of the nickel powder. FIG. 3 is a transmission electron microscope (TEM) image of graphene shells prepared according to Example 1.

Example 2

Figure 4:
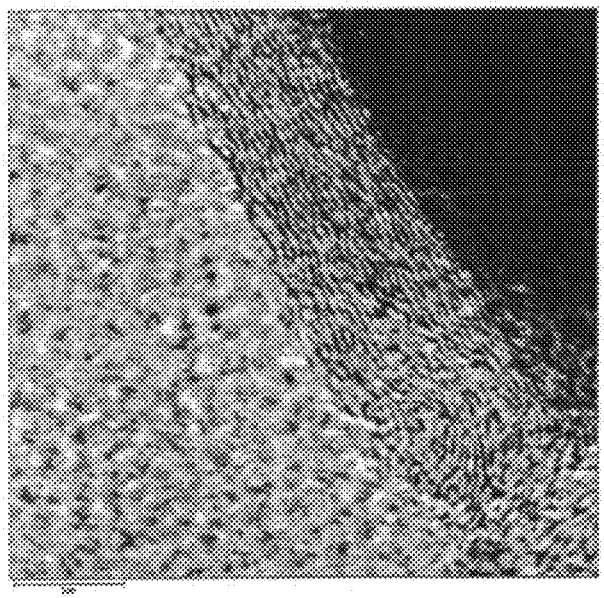
FIG. 4 is a TEM image of graphene shells on nickel particles of Example 2.

Graphene shells were prepared in the same way as Example 1 except that the dried carburized nickel powder was heat treated at a temperature of about 700° C. instead of about 450° C. and was not acid-washed. FIG. 4 is a TEM image of graphene shells on nickel particle prepared according to Example 2.

Example 3

280 g of nickel powder prepared using a liquid phase reduction method was dispersed in a mixture of 14 g of 50% NaOH solution and 3.5 L of triethylene glycol. Then, the mixture was allowed to sit at a temperature of 250° C. or higher for about 2 hours to carburize the nickel powder. Mechanical agitation was performed on the mixture at about 370 rpm using an impeller. Then, carburized nickel powder was separated from the mixture by passing the mixture through a filter, and the carburized nickel powder was washed using acetone and ethanol solutions by ultrasonic and mechanical agitation. Thereafter, the carburized nickel powder was dried in a vacuum oven at about 50° C. overnight. In this way, 285 g of dried carburized nickel powder containing 2.7% by weight of carbon was obtained. The dried carburized nickel powder was allowed to sit in an argon gas atmosphere at about 400° C. for about 1 hour and was washed using a HCl solution to obtain spherical graphene shells having a thickness of about 5 nm.

Example 4

Spherical graphene shells having a thickness of about 7 nm were prepared in the same way as Example 3 except that the carburization of the nickel powder was performance for about 4 hours. In Example 4, after a drying process, 3.3% by weight of carbon was contained in the dried carburized nickel powder.

Example 5

Spherical graphene shells having a thickness of about 10 nm were prepared in the same way as Example 3 except that the carburization of the nickel powder was performance for about 6 hours. In Example 4, after a drying process, 5.6% by weight of carbon was contained in the dried carburized nickel powder.

Example 6

Spherical graphene shells having a thickness of about 6 nm and 15 graphene layers were prepared in the same way as Example 5 except that an additional heat treatment process was performed on the carburized nickel powder at about 1800° C. for about 2 hours.

Experimental Example 1

Measurement of Crystallinity

Figure 5:
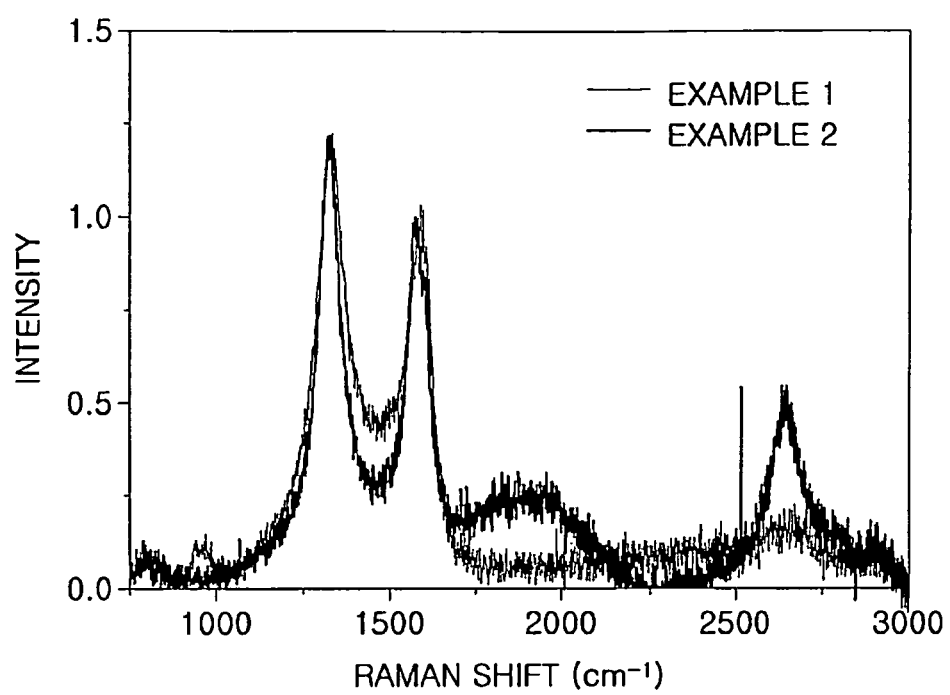
FIG. 5 is a Raman spectra of the graphene shells of Examples 1 and 2.
Figure 10:
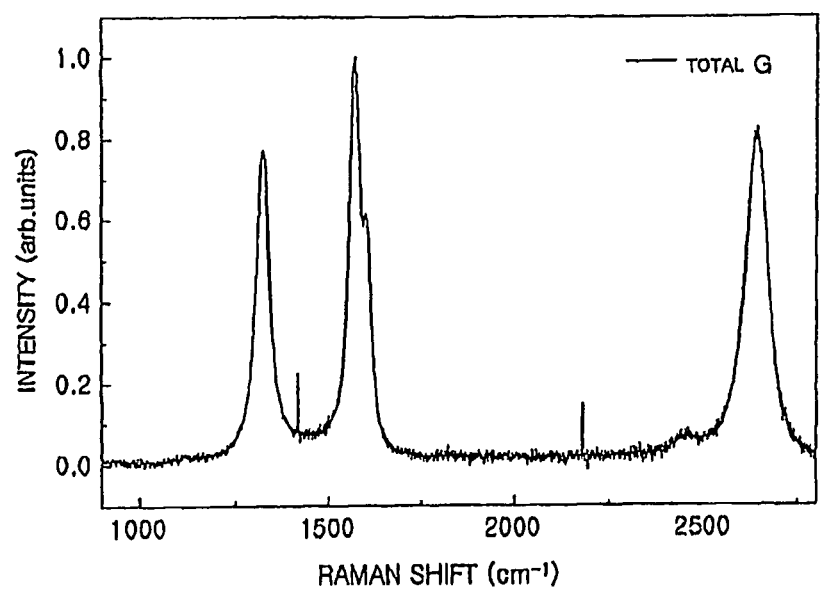
FIG. 10 is a Raman spectrum of graphene shells of Example 6.

A Raman spectroscopy was performed on the graphene shells of Examples 1 and 2, and the results are shown in FIG. 5. A Raman spectroscopy was also performed on the graphene shells of Example 6, and the results are shown in FIG. 10. Referring to FIG. 5, since the heat treatment temperature of Example 2 is higher than that of Example 1, it can be seen from G band sharpness and $G^+$ peaks that the graphene shells of Example 2 have better crystalline characteristics than the graphene shells of Example 1.

That is, graphene shells having better crystalline characteristics can be obtained by increasing the heat treatment temperature or performing an additional high-temperature heat treatment.

Experimental Example 2

Measurement of Carbon Content

Figure 6A:
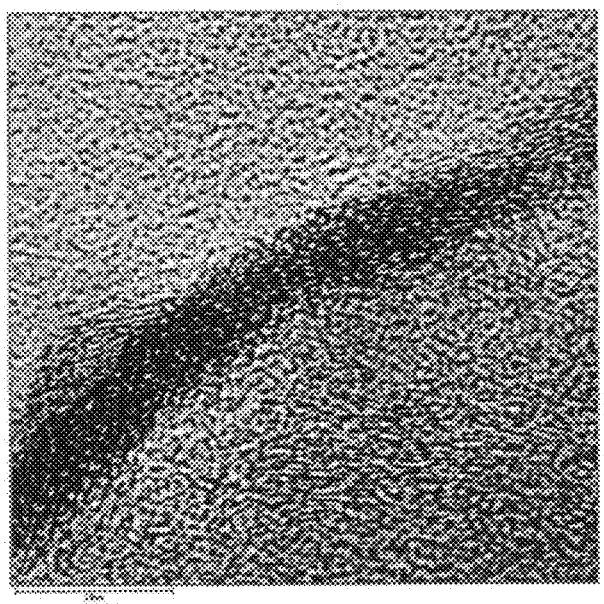
FIGS. 6 through 9 are TEM images of graphene shells of Examples 3 through 6.
Figure 6B:
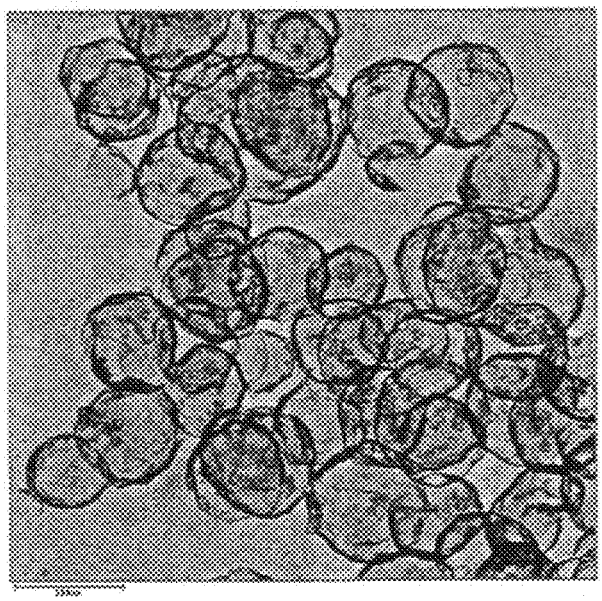
Figure 7A:
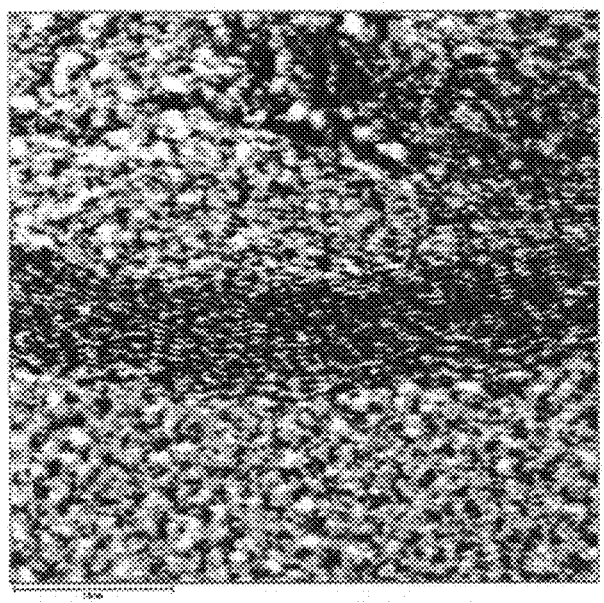
Figure 7B:
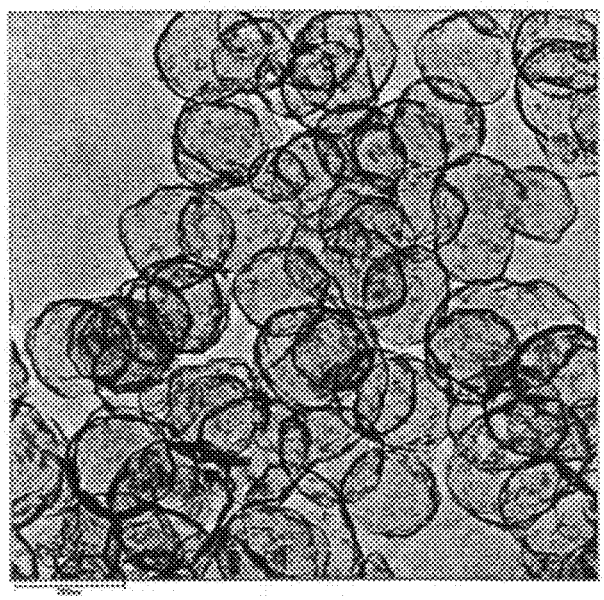
Figure 8A:
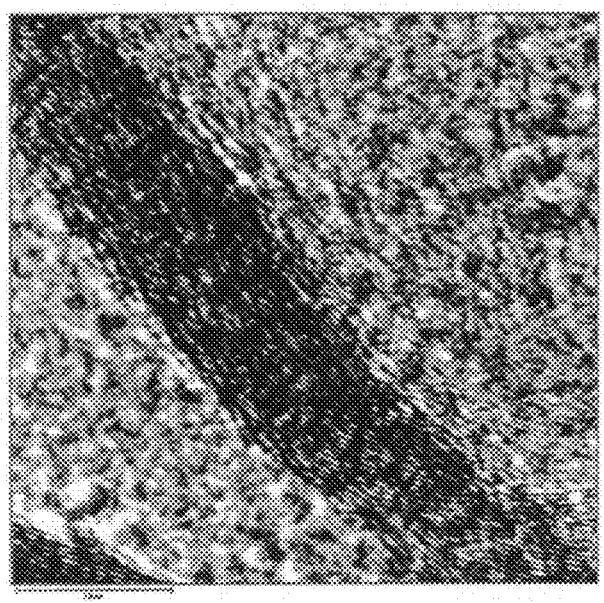
Figure 8B:
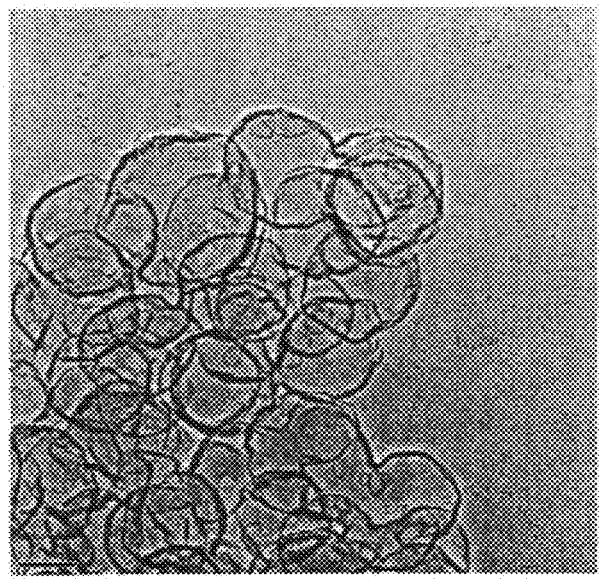
Figure 9:
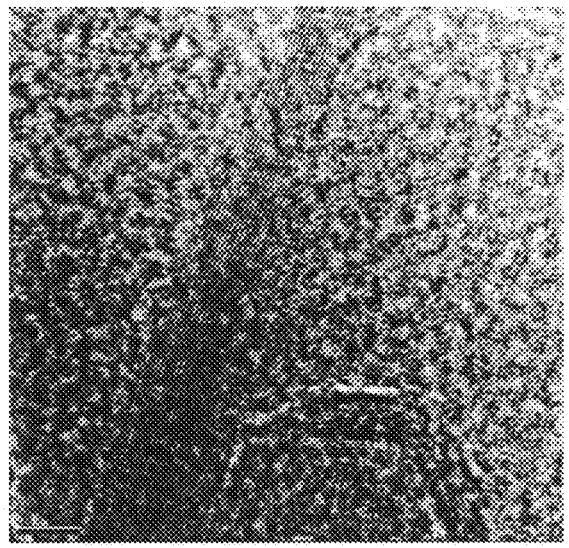

The carbon content of the carburized nickel was measured using an element analyzer to evaluate a relationship between the carbon content and carburization process time, and the results are shown in Table 1 below. Images of the graphene shells are shown in FIGS. 6A, 6B, 7A, 7B, 8A, and 8B. FIGS. 6A and 6B show TEM images of the graphene shells of Example 2 obtained by performing the carburization process for about 2 hours, and FIGS. 7A and 7B show TEM images of the graphene shells of Example 3 obtained by performing the carburization process for about 4 hours. FIGS. 8A and 8B show TEM images of the graphene shells of Example 5 obtained by performing the carburization process for about 6 hours. FIG. 9 shows TEM image of the graphene shell of Example 6.

TABLE 1

| Example No. | Carbon concentration (weight %) |
| --- | --- |
| Example 3 | 2.709944 |
| Example 4 | 3.305675 |
| Example 5 | 5.578137 |

Referring to Table 1, the amount of carbon diffused into nickel (a catalyst metal) by carburization is proportional to the carburization process time. Therefore, the thickness of graphene shells is proportional to the carburization process time.

As described above, the present invention provides an economical method of preparing a crystalline graphene shell having a desired shape. The present invention also provides an effective method of controlling the thickness of the graphene shell. Graphene shells obtained using the method can be effectively used in various fields. For example, the graphene shells of the present invention can be used as a hydrogen reservoir, an optical fiber, a conductor, a micro reactor, or a chemical carrier.

While disclosed embodiments have been shown and described with reference to embodiments thereof, it will be understood by those skilled in the art that various changes in form and details may be made therein without departing from the spirit and scope of the invention as defined by the appended claims.

In addition, many modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguished one element from another. Furthermore, the use of the terms a, an, etc. do not denote a limitation of quantity, but rather denote the presence of at least one of the referenced item.

What is claimed is:

1. A method of preparing a graphene shell, comprising:
   performing a first heat treatment on a mixture of an organic solvent and a graphitization metal catalyst so as to carburize the graphitization metal catalyst with carbon decomposed from the organic solvent, the graphitization metal catalyst being in the form of particles; and
   forming graphene shells on surfaces of the carburized graphitization metal catalyst by performing a second heat treatment process on the carburized graphitization metal catalyst in an inert or reductive gas atmosphere; and wherein the graphitization metal catalyst comprises at least one metal selected from the group consisting of Ni, Co, Fe, Pt, Au, Al, Cr, Cu, Mg, Mn, Mo, Rh, Ta, Ti, W, U, V, Zr, and an alloy thereof; and wherein the graphene shell has the same shape as the metal catalyst.

2. The method of claim 1, wherein the organic solvent is a polar or non-polar organic solvent having a boiling point of about 60° C. to about 400° C.

3. The method of claim 1, wherein the organic solvent comprises an alcohol based organic solvent, an ether based organic solvent, a ketone based organic solvent, an ester based organic solvent, an acid based organic solvent, or a mixture thereof.

4. The method of claim 1, wherein the organic solvent is an alcohol based organic solvent or an ether based organic solvent, or a mixture thereof.

5. The method of claim 4, wherein the alcohol based organic solvent is selected from the group consisting of monohydric alcohols and polyhydric alcohols.

6. The method of claim 5, wherein the monohydric alcohol is selected from the group consisting of propanol, pentanol, hexanol, heptanol, and octanol.

7. The method of claim 5, wherein the polyhydric alcohol is selected from the group consisting of propylene glycol, diethylene glycol, dipropylene glycol, triethylene glycol, tripropylene glycol, octylene glycol, tetraethylene glycol, neopentyl glycol, 1,2-butanediol, 1,3-butanediol, 1,4-butanediol, 2,3-butanediol, dimethyl-2,2-butanediol-1,2, and dimethyl-2,2-butanediol-1,3.

8. The method of claim 1, wherein a base is added to the organic solvent.

9. The method of claim 8, wherein the base includes an organic base.

10. The method of claim 8, wherein the base is selected from the group consisting of tetramethyl ammonium hydroxide (TMAH), sodium hydroxide and potassium hydroxide.

11. The method of claim 8, wherein the base is added to the organic solvent in a concentration of about 0.01M to about 5.0 M.

12. The method of claim 8, wherein the base is added with water.

13. The method of claim 1, wherein the graphitization metal catalyst is formed from a catalyst precursor in the organic solvent before or simultaneously with the first heat treatment process.

14. The method of claim 13, wherein the catalyst precursor is a metal salt of the graphitization metal catalyst.

15. The method of claim 13, wherein the mixture further includes a nucleating agent.

16. The method of claim 15, wherein the nucleating agent includes at least one of $K_2PtCl_4$, $H_2PtCl_4$, $PdCl_2$, and $AgNO_3$.

17. The method of claim 1, wherein the graphitization metal catalyst has a spherical shape, a cylindrical shape, or a polyhedral shape.

18. The method of claim 1, wherein the first heat treatment process is performed in a temperature range of about 100° C. to about 400° C. for about 10 minutes to about 24 hours.

19. The method of claim 1, wherein the first heat treatment process is performed while agitating the mixture.

20. The method of claim 1, wherein the second heat treatment process is performed in a temperature range of about 400° C. to about 100° C. for about several seconds to about 10 hours.

21. The method of claim 1, further comprising performing an acid treatment process to remove the graphitization metal catalyst from the graphene shells.

22. The method of claim 21, further comprising performing a third heat treatment process on the graphene shells after the performing of the acid treatment process.

23. The method of claim 22, wherein the third heat treatment process is performed at a temperature range of about 1000° C. to about 3000° C. for about several seconds to about 10 hours.

24. The method of claim 8, wherein the base includes an inorganic base.

25. A method of preparing a graphene shell, comprising:
    performing a first heat treatment on a mixture of an organic solvent and a graphitization metal catalyst so as to carburize the graphitization metal catalyst with carbon decomposed from the organic solvent, the graphitization metal catalyst being in the form of particles; and
    forming graphene shells on surfaces of the carburized graphitization metal catalyst by performing a second heat treatment process on the carburized graphitization metal catalyst in an inert or reductive gas atmosphere without the presence of an external vapor carbon source; the graphitization metal catalyst comprises at least one metal selected from the group consisting of Ni, Co, Fe, Pt, Au, Al, Cr, Cu, Mg, Mn, Mo, Rh, Si, Ta, Ti, W, U, V, Zr, and an alloy thereof.

26. A method of preparing a graphene shell, consisting of:
    performing a first heat treatment on a mixture of an organic solvent and a graphitization metal catalyst so as to carburize the graphitization metal catalyst with carbon decomposed from the organic solvent, the graphitization metal catalyst being in the form of particles; and
    forming graphene shells on surfaces of the carburized graphitization metal catalyst by performing a second heat treatment process on the carburized graphitization metal catalyst in an inert gas atmosphere; the graphitization metal catalyst comprises at least one metal selected from the group consisting of Ni, Co, Fe, Pt, Au, Al, Cr, Cu, Mg, Mn, Mo, Rh, Ta, Ti, W, U, V, Zr, and an alloy thereof.

27. The method of claim 26, wherein a base is added to the organic solvent.

28. The method of claim 26, wherein the graphitization metal catalyst is formed from a catalyst precursor in the organic solvent before or simultaneously with the first heat treatment process.

29. The method of claim 26, further comprising performing an acid treatment process to remove the graphitization metal catalyst from the graphene shells.

30. The method of claim 21, further comprising performing a third heat treatment process on the graphene shells after the performing of the acid treatment process.

* * * * *